United States Patent [19]

Bitter, Jr. et al.

[11] 4,403,222

[45] Sep. 6, 1983

[54] PASSIVE RF PATH DIVERTER

[75] Inventors: Charles R. Bitter, Jr., Scottsdale; Raymond M. Cripps, Phoenix, both of Ariz.

[73] Assignee: Motorola Inc., Schaumburg, Ill.

[21] Appl. No.: 237,003

[22] Filed: Feb. 23, 1981

[51] Int. Cl.³ .............................................. H01Q 19/00
[52] U.S. Cl. .................................. 343/833; 343/18 B; 343/100 PE; 343/797
[58] Field of Search ............... 343/18 B, 100 PE, 797, 343/833, 834, 835

[56] References Cited

U.S. PATENT DOCUMENTS 3,524,191 8/1970 Ehrenspeck .................... 343/833 X Primary Examiner—T. H. Tubbesing
Attorney, Agent, or Firm—Eugene A. Parsons

[57] ABSTRACT

A passive device is taught which diverts radio-frequency electromagnetic energy from an original path to a new path at a 90° angle. The device eliminates the large reflective sheets which characterize prior art devices for the same purpose. The device utilizes a modified Yagii-Uda parasitic array to excite a cross-dipole element which reradiates the energy along the new direction. A particular application is shown for placing the device in or on a wall or the like for unobtrusive diversion of energy.

8 Claims, 3 Drawing Figures

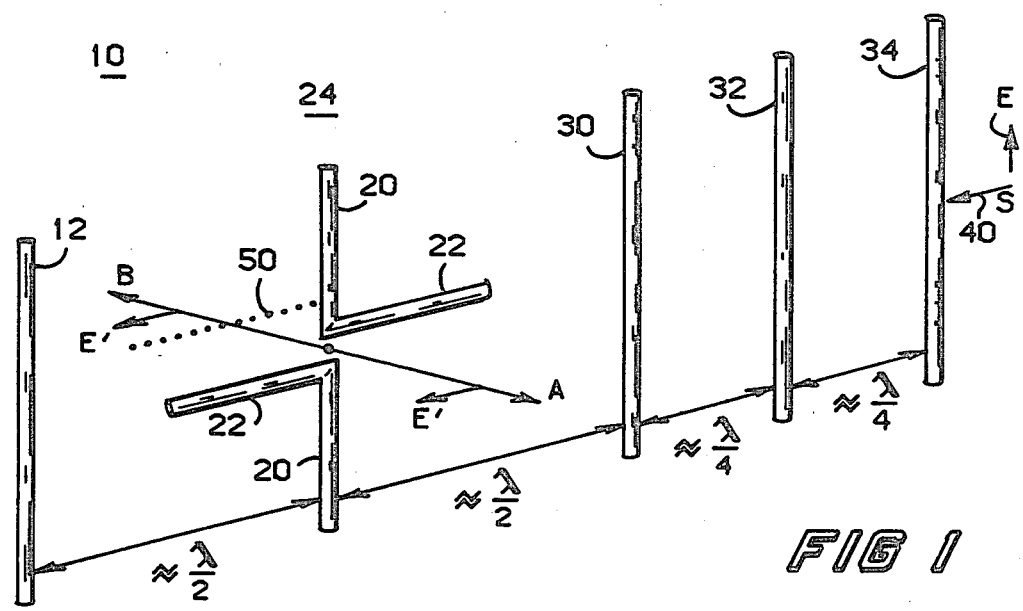
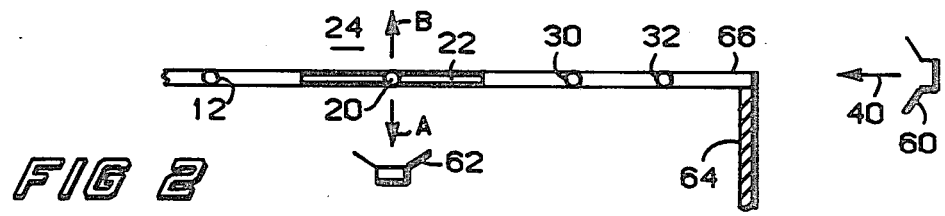
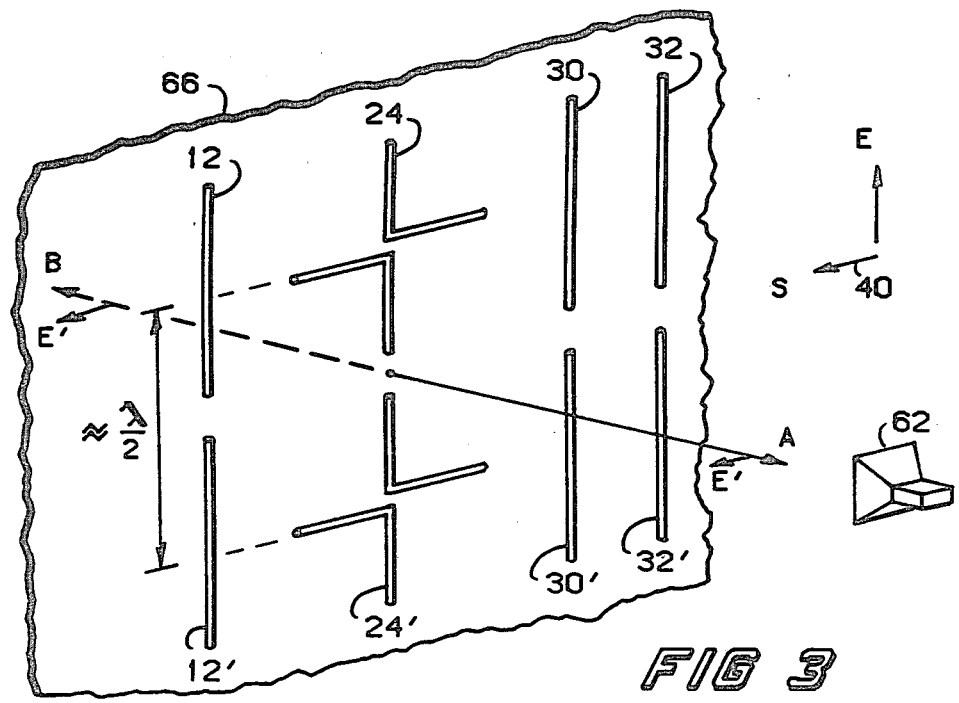

PASSIVE RF PATH DIVERTER

This invention is covered by the terms of a contract between the assignee and the U.S. Government. Under the terms of this contract, the contractor retains title to this invention and the Government is granted a non-exclusive license.

FIELD OF THE INVENTION

The present invention relates, in general, to devices for changing the direction of propagation of radio frequency electromagnetic energy. More particularly, the invention relates to a passive RF path diverter which presents a low profile with respect to the original direction of propagation.

BACKGROUND OF THE INVENTION

The problem addressed by this invention is to divert RF energy from one direction of propagation to another. This problem may be encountered when one wishes to concentrate and change direction of energy propagating from a single given source direction into another direction typically at 90 degrees to the first to enable that energy to reach a point by a path other than directly. Alternately, this point may be screened from the source of the RF energy by an RF opaque obstacle, and one may wish to divert the energy around the obstacle. This invention is drawn to the problem of diverting RF energy by 90° from an original path.

Prior art devices achieve the desired result by placing a reflecting sheet at a 45° angle in the path of the RF energy. These devices operate very efficiently but present a relatively large surface area obstacle with a high profile in the path of the on-coming radiation. For this reason the prior devices are very difficult to make inconspicuous.

SUMMARY OF THE INVENTION

Accordingly, it is an object of the present invention to provide an improved type of path diverter for RF energy.

It is a further object of the invention to provide a passive path diverter which presents a low profile with respect to the direction of the undiverted radiation.

These and other objects of the present invention will be apparent to one skilled in the art from the description and drawings below.

A particular embodiment of the invention provides a cross dipole structure and a modified Yagi-Uda array of parasitic elements. The parasitics induce a directive response in a first dipole of the cross dipole structure, which in turn drives a quadrature positioned second dipole of the structure. The second dipole radiates RF energy of obviously quadrature polarization in a bidirectional pattern centered at 90° from the original path of radiation.

BRIEF DESCRIPTION OF THE DRAWINGS

FIG. 1 is a perspective view of a path diverter of the present invention;

FIG. 2 is an example of an application of the present invention; and

FIG. 3 is another example of an application of the present invention.

DETAILED DESCRIPTION OF THE INVENTION

Referring now to FIG. 1, a diverter 10 of the present invention is described. First, a modified Yagi-Uda array of passive parasitic elements is shown. These consist of reflector 12 and directors 30, 32, and 34. All of the parasitic elements are substantially linear conductors. These may be constructed of any convenient electrical conducting material such as metalized paint, a metal foil, or wire. As is typical of Yagi-Uda arrays, all of the parasitic elements are parallel and lie in a single plane, which will be referred to as the plane of the apparatus. Directors 30, 32, and 34 are spaced approximately one-quarter wavelength apart and reflector 12 is spaced approximately one wavelength from director 30. The lengths and spacings of the parasitic elements may be changed according to familiar practice in the art for purposes of tuning the array to produce optimum performance at a particular wavelength. The spacings and lengths shown in FIG. 1 are intended to be only illustrative. Furthermore, a particular embodiment of the invention may utilize different numbers of directors and reflectors, depending on the gain and directivity required and the space available. While the gain of a diverter of this type may be less than that of a reflecting sheet, the gain may be increased or decreased and the operative bandwidth of the apparatus changed by design of the parasitic array. In the extreme case, all of the passive parasitic elements described above may be eliminated, with an attendant sacrifice of gain.

Approximately centered between reflector 12 and director 30 and lying in the plane of the apparatus is cross-dipole structure 24. This consists of a first dipole with colinear portions 20 which are parallel to the parasitic elements and a second dipole with non-colinear portions 22 perpendicular to the parasitic elements of the apparatus and connected to the first dipole as shown. In other words, each portion 22 is connected to a portion 20, forming cross-dipole 24. Cross-dipole structure 24 is to be constructed of a convenient conducting material such as metalized paint, a metal foil, or wire, as in the case of the parasitic elements. Various other types of simple antennas may be appropriate as replacements for the dipoles of the cross-dipole structure. As will be apparent to those skilled in the art, derivatives of a dipole such as a spiral element may be used.

In operation, RF energy from source S is directed along an original path of propagation 40, as shown, with polarization E parallel to the passive parasitic elements of the apparatus. A response is induced in first dipole portions 20 and is enhanced by the presence of the parasitic array, 12, 30, 32 and 34. This is the familiar operation of a Yagi-Uda array. This in turn drives quadrature dipole portions 22 which radiate with a familiar radiation pattern. The usual direction of interest is either A or B. The energy radiated in these directions has quadrature polarization E', as shown. It is possible to enhance the gain of the apparatus in direction A, for instance, by placing a conventional reflector element in a position such as marked by dotted line 50. This element would be approximately one-quarter wavelength from cross-dipole 24 and would be parallel to the plane of the apparatus.

Referring now to FIG. 2, a possible application of the present invention is shown. Source 60 and receiving antenna 62 are separated by obstacle 64 which is opaque to RF energy. A diverter of the present invention may be placed in or on a non-opaque surface 66 such as a non-metallic wall. As shown here, reflector 12, directors 30 and 32 and cross-dipole 24 may be embedded in surface 66. Alternately metal foil elements may be applied to the surface of wall 66. RF energy 40 from source 60 is diverted along paths A and B to be received by antenna 62.

Referring now to FIG. 3, a possible modification to the embodiment of FIG. 2 is shown. As will be seen, this is different from FIG. 2 only in that two diverter apparatus of the present invention are employed. Second diverter apparatus 12', 24', 30', 32' is placed coplanar to first diverter apparatus 12, 24, 30, 32 and spaced to provide increased gain over the embodiment of FIG. 2. For example, the two diverter apparatus' symmetry lines may be spaced one-half wavelength apart with corresponding parasitic elements colinear. This embodiment increases the amount of energy diverted to receiving antenna 62. Of course, this presents added surface area requirements at surface 66, but it is extremely less obtrusive than a large high profile sheet reflector placed at a 45° angle.

It is possible to stack or array as many coplanar diverters as is practical, all with the proper spacing, and orientation to increase the gain of the entire system. This, of course, involves a choice between available surface area and gain which must be made in light of the particular requirements of each application of the present invention.

It will be recognized by those skilled in the art that the propagation route used above to describe the invention may be reversed without an effect on the operability of the invention.

Various other modifications will be apparent to those skilled in the art from the drawings and descriptions herein. All such modifications are intended to be within the spirit and scope of the invention.

We claim:

1. Apparatus for diverting RF energy of a predetermined wavelength comprising:
   a first substantially linear passive element;
   a second substantially linear passive element, said second passive element being parallel to said first passive element and at a distance of approximately one wavelength therefrom, said first and second passive elements lying in a plane of the apparatus;
   at least one additional substantially linear passive element, said at least one additional passive element being parallel to said first and second passive elements and lying in said plane of the apparatus, said at least one additional passive element being placed approximately one-quarter wavelength beyond said second passive element;
   a first dipole having two colinear portions lying in the plane of the apparatus and being approximately centered between said first passive element and said second passive element, said colinear portions being parallel to said passive elements; and
   a second dipole having two non-colinear portions connected to said first dipole portions, said second dipole portions lying in said plane of the apparatus and being perpendicular to said passive elements.

2. The apparatus according to claim 1 further including at least one other apparatus according to claim 1, said at least one other apparatus being coplanar with said apparatus and oriented thereto to provide increased gain.

3. The apparatus according to claim 1 including a reflector element parallel to said plane of the apparatus and approximately one-quarter wavelength therefrom.

4. A passive RF path diverter comprising:
   at least one reflector element;
   at least one director element; and
   a cross-dipole element, all said elements being substantially coplanar, said cross-dipole element being disposed between said at least one reflector element and said at least one director element.

5. The diverter according to claim 4 including a reflector element parallel to said cross dipole element and approximately one-quarter wavelength therefrom.

6. The diverter according to claim 4 further including at least one other diverter according to claim 4 coplanar with said diverter and oriented thereto to provide increased gain.

7. A passive apparatus for diverting RF energy from an original direction of propagation comprising:
   means for radiating RF energy in a direction approximately 90 degrees from said original direction of propagation;
   means for responding to RF energy propagating in said original direction and for driving said radiating means, said responding means and said radiating means lying substantially in a plane containing said original direction of propagation.

8. The apparatus according to claim 7 further comprising:
   parasitic element means for enhancing the response of said responding means to RF energy propagating in said original direction of propagation, said parasitic element means lying in said plane.

* * * * *